United States Patent
Herman et al.

(10) Patent No.: US 10,755,691 B1
(45) Date of Patent: Aug. 25, 2020

(54) SYSTEMS AND METHODS FOR ACOUSTIC CONTROL OF A VEHICLE'S INTERIOR

(71) Applicant: Ford Global Technologies, LLC, Dearborn, MI (US)

(72) Inventors: David Michael Herman, Oak Park, MI (US); Nunzio DeCia, Northville, MI (US); Nicholas Scheufler, Flat Rock, MI (US); Stephen Jay Orris, New Boston, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/418,849

(22) Filed: May 21, 2019

(51) Int. Cl.
  *G06F 3/0484* (2013.01)
  *G10K 11/178* (2006.01)
  *G06K 9/00* (2006.01)

(52) U.S. Cl.
  CPC .... *G10K 11/17827* (2018.01); *G06K 9/00791* (2013.01); *G10K 11/17823* (2018.01); *G10K 11/17853* (2018.01); *G06F 3/0484* (2013.01); *G10K 2210/124* (2013.01); *G10K 2210/1282* (2013.01); *G10K 2210/3028* (2013.01)

(58) Field of Classification Search
  CPC ....... G10K 11/17827; G10K 11/17823; G10K 11/17853; G10K 2210/124; G10K 2210/1282; G10K 2210/3028; G06K 9/00791; G06F 3/0484
  USPC .................................. 381/71.4, 71.6; 706/20
  See application file for complete search history.

(56) References Cited

U.S. PATENT DOCUMENTS

| | | | |
|---|---|---|---|
| 10,210,756 B2 | 2/2019 | Arunachalam | |
| 10,275,662 B1* | 4/2019 | Askeland | H04N 5/247 |
| 2012/0230504 A1* | 9/2012 | Kuroda | G10K 11/17837 381/71.4 |
| 2013/0156214 A1* | 6/2013 | Murthy | G10K 11/002 381/71.6 |
| 2017/0200443 A1* | 7/2017 | Kurosawa | H03G 3/3005 |
| 2018/0053413 A1 | 2/2018 | Patil et al. | |
| 2018/0114445 A1 | 4/2018 | Jang et al. | |
| 2018/0335503 A1 | 11/2018 | Seifert et al. | |
| 2019/0052967 A1 | 2/2019 | Kim et al. | |
| 2019/0096215 A1* | 3/2019 | Shahid | G06K 9/6201 |
| 2019/0130756 A1* | 5/2019 | Ghannam | G08G 1/165 |
| 2019/0147372 A1* | 5/2019 | Luo | G06N 20/00 706/20 |
| 2019/0303759 A1* | 10/2019 | Farabet | G06K 9/00791 |

FOREIGN PATENT DOCUMENTS

DE    102014226026 A1    6/2016

* cited by examiner

*Primary Examiner* — Vivian C Chin
*Assistant Examiner* — Friedrich Fahnert
(74) *Attorney, Agent, or Firm* — Frank Lollo; Eversheds Sutherland (US) LLP

(57) ABSTRACT

Systems, methods, and computer-readable media are disclosed for acoustic control of a vehicle's interior. Example methods may include detecting environmental sounds external to a cabin of a vehicle and determining at least one first sound from the environmental sounds, wherein the cabin is configured to reduce a volume of the environmental sounds below a threshold; determining location information comprising a direction and a distance of the first sound with respect to the vehicle; and generating a second sound based on the first sound and the location information that reproduces a spectral feature of the first sound.

19 Claims, 6 Drawing Sheets

SYSTEMS AND METHODS FOR ACOUSTIC CONTROL OF A VEHICLE'S INTERIOR

TECHNICAL FIELD

The present disclosure relates to systems and methods for acoustic control, and more specifically, to methods and systems for acoustic control of a vehicle's interior.

BACKGROUND

Today's vehicles have increasingly quieter cabins. In particular, vehicles can use sound damping materials to isolate the vehicle's interior from external noise. Additionally, vehicles can include noise reduction systems to help provide a quieter driving experience. Reducing cabin noise, however, may not be selective as to the type of noise that is reduced. For example, passive or active noise reduction techniques may attenuate environmental sounds indiscriminately. Accordingly, sounds that the driver or passengers may want to hear may be attenuated as much as sounds that the occupants may not want to hear. Therefore, what are needed are systems and methods for providing acoustic control of a vehicle's interior.

DETAILED DESCRIPTION

Overview

Figure 1:
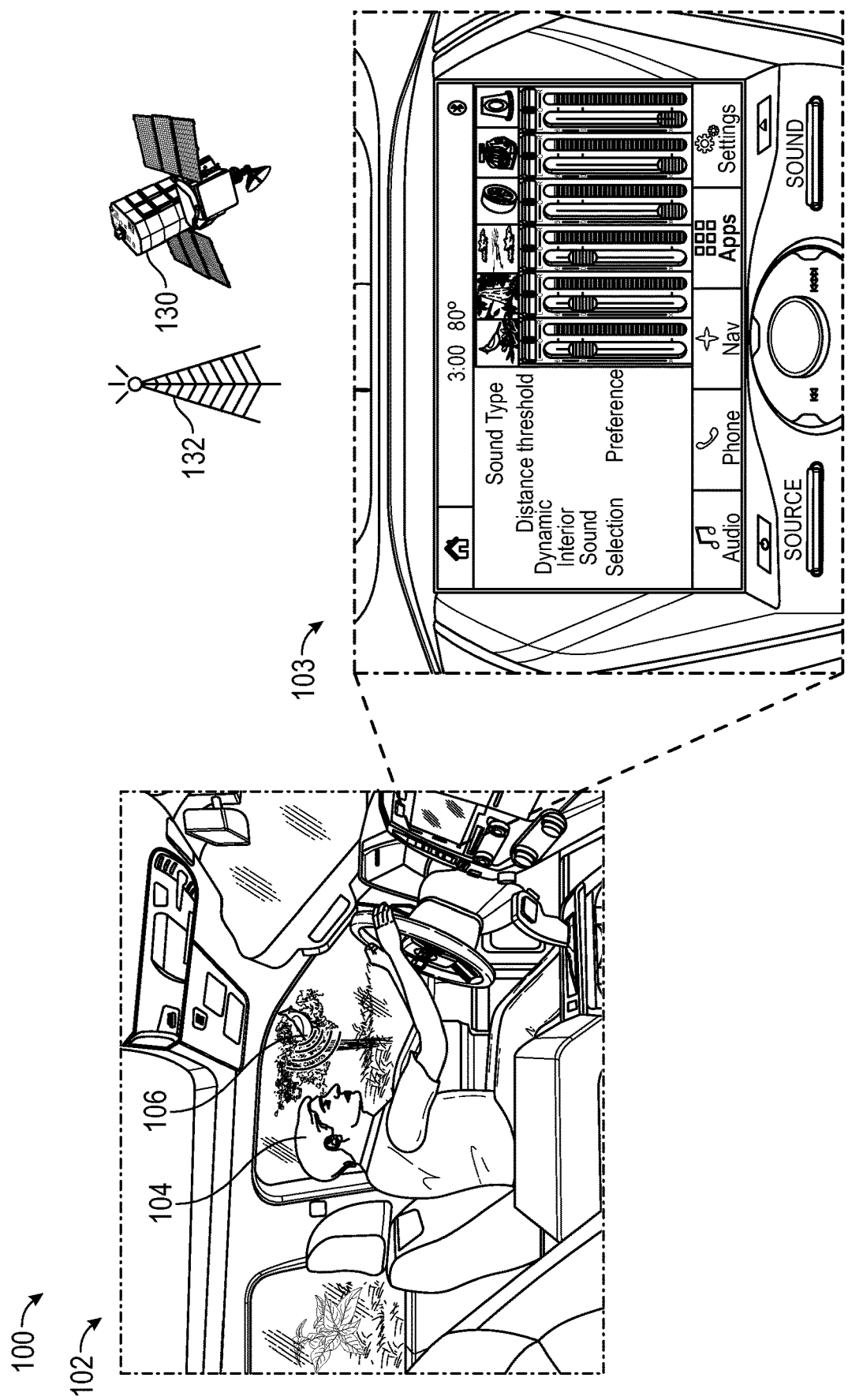
FIG. 1 shows a diagram of an example environmental context for providing acoustic control of a vehicle's interior, in accordance with example embodiments of the disclosure.

Vehicles are increasingly acoustically isolated from the exterior environment purportedly to improve a user's cabin experience. In some cases, acoustic isolation and damping has reduced the sound level associated with engine sounds, which may be undesired by the occupants of the vehicle. Accordingly, a vehicle's cabin interior speakers can be used to emulate certain sounds, for example, artificial engine sounds. This sound emulation may be performed in order to provide occupants with the acoustic feedback that they may be used to or desire to perceive. In particular, engine sound emulation may be implemented for electric vehicles which may generally be quieter due to (1) their use of electric motors, and (2) the increased sound isolation provided in such vehicles' interiors as compared with fossil-fuel based vehicles.

However, drivers in such acoustically-isolated environments (for example, electric vehicle cabins) may have reduced situational awareness. For example, the drivers may be unable to adequately hear emergency sirens and honking sounds of other drivers that generally serve to alert drivers to changing road environments. Moreover, conventional systems may simultaneously filter out sounds that the occupants may find pleasing (for example, birds chirping, ocean sounds, and the like). An occupant may be required to open a window to hear such sounds, unfortunately limiting the cooling and/or heating mechanisms of the vehicle. Additionally, the opening of the vehicle's windows may result in bothersome noise generated from high wind speeds through the vehicle cabin or generated from wind buffeting.

Today's vehicles may come equipped with a plethora of sensors. Such sensors include, but are not limited to, microphones, cameras, internal vehicle sensors (for example, engine sensors, traction control sensors, acceleration sensors, rain sensors, and/or the like), and telematics-based sensors (for example, 5G connectivity sensors, vehicle-to-everything (V2X) sensors, and/or the like). Vehicles are also increasingly being connected to one another and to infrastructural components (for example, using V2X protocols). Accordingly, a vehicle may use such sensors to detect, directly or indirectly, environmental sounds such as sirens or honking sounds. In some examples, the disclosed systems may generate and present emulated sounds to the occupants of a vehicle based on the detected environmental sounds. Further, the disclosed systems may generate sounds (1) of a given type (e.g., road sounds, engine sounds, siren sounds, etc.) and (2) having certain characteristics (e.g., volume, pitch, etc.) based on the detected sounds. In some instances, the disclosed systems may generate sounds based on a consideration of the effects of Doppler shifting. The generation of such emulated sounds may be based on user preferences and/or safety considerations. In some examples, the generation and presentation of emulated sounds may be performed through the use of any suitable digital signal processing (DSP) algorithms and/or artificial intelligence (AI)-based techniques, such as deep neural networks.

In some examples, the disclosed systems may detect and extract environmental sounds from a single or from multiple audio channels. For example, the detection of the sounds may be performed using a microphone array having a predetermined number and spatial arrangement. Furthermore, the environmental sounds may be stationary and localized in space (for example, having a well-characterized direction and location) or may include ambient sounds that are less spatially localized. In other cases, the environmental sounds may be associated with moving objects having a velocity or acceleration with respect to the vehicle. Accordingly, the disclosed systems may also determine various other properties (such as a relative or absolute velocity vector of a sound source and/or the vehicle) associated with the environmental sounds. In some cases, the disclosed systems may determine a Doppler shift of such sounds as sirens.

Depending on user preferences or original equipment manufacturer (OEM)-determined settings, the disclosed systems may use these environmental sounds and their attributes to alert the occupants to the outside world to improve the occupant's situational awareness. For instance, the environmental sounds may be played within a vehicle's cabin in a manner to emulate a virtually-projected sound using the cabin speakers of the vehicle such that the perceived location of the sound is similar to the actual real-world location of the sound. Furthermore, the disclosed systems may (1) modify the acoustic signal to include Doppler shift effects and may (2) modify the intensity of the acoustic signal based on user preferences as inputted via an application running on a vehicle device or a user device (e.g., mobile phone).

The disclosed systems may also present visual alerts based on the detected environmental sounds, the visual alerts presented to vehicle occupants in addition to or in substitute for the environmental sounds. The disclosed systems may generate and present such visual alerts on a vehicle's heads-up displays, center console displays, and/or the like. The disclosed systems may also present the visual alerts alongside onboard map information showing the vehicle's current location. For example, the disclosed systems may present the visual alerts on a virtual map to denote the location of the sound along with other driving information (for example, a vehicle's heading, speed, and/or the like).

ILLUSTRATIVE EXAMPLES

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The disclosed systems may detect sounds external to a vehicle's cabin, determine the respective directions and locations associated with external sounds. Accordingly, the disclosed systems may emulate the external sounds within the vehicle cabin. In some examples, the disclosed systems can emulate the directionality and location of the detected sounds, for example, using a multi-channel and multi-zonal vehicle audio system. The disclosed systems may include systems and methods to detect user-desired environmental sounds and filter out environmental sounds that are not desirable by users.

In some examples, the disclosed systems may configure a physical interface and/or a human-machine interface (HMI) to accept various user-selected parameters. For example, the disclosed systems may use the interface to allow users to determine desired and undesired environmental sounds to be filtered out of the vehicle cabin. In some examples, the disclosed systems may provide techniques for prioritizing the criticality of external sounds which may be informed, at least in part, by user input. For example, the disclosed systems may determine a higher priority associated with sirens from emergency vehicles as compared with user-preferred environmental sounds (for example, birds chirping). The disclosed systems may perform real-time acoustic trilateration via V2V communications with other vehicles that sample external audio, as further shown and described in connection with FIG. 4, below. The acoustic trilateration may be improved using map-matching that include the road geometry and using an onboard map database.

FIG. 1 shows a diagram of an environmental context, in accordance with example embodiments of the disclosure. FIG. 1 represents an environmental context 100 that includes a vehicle 102. In some examples, the vehicle 102 may include an autonomous vehicle (AV).

In some examples the disclosed systems may include a vehicle 102 having sensors. The sensors may include, but not be limited to, microphone(s), cameras, vehicle systems (engine, traction control, brakes, accelerometers, rain sensor, and/or the like). The vehicle 102 may include an audio DSP capability that can project virtual sounds in any direction within the cabin in combination with multiple speakers within the vehicle. The vehicle 102 may have various wireless-connectivity capabilities, for example, to enable indirect measurements of various environmental objects. In some examples, one wireless-connectivity capability may include a V2X communications capability. The vehicle 102 may have a location-determination capability (for example, a global positioning system (GPS) capability) and the ability to receive and process mapping information. These capabilities are discussed further below.

In some examples, the vehicle 102 may include an audio-detection capability. The disclosed systems may include a vehicle-based microphone(s). In some examples the vehicle-based microphone(s) may include exterior microphone(s). The exterior microphone may be used to detect acoustic signals of interest (e.g., bird chirping sounds 106) and extract sounds corresponding to the acoustic signal of interest from the signals detected by the microphone(s). In other examples, the disclosed systems may use AI-based techniques to enhance the detection and extraction of the sounds by the exterior microphone(s). For example, the disclosed systems may use a neural network to detect audio events for sound extraction and an audio signal obtained from the environment via the microphone. In other examples, the disclosed systems may use multiple audio samples obtained over time or space and via the microphone(s) to perform acoustic trilateration, as further shown and described in connection with FIG. 4, below.

In some examples, the vehicle 102 may include a camera (for example, a vehicle-based camera), not shown. The camera can be used to detect flashing lights and other signals associated with emergency vehicles, as described further in connection with FIGS. 2-3, below. The camera can also be used to detect other sound-emitting visual indicators in the vehicle's environment. In some examples, the vehicle may include a camera aimed internally at the driver and/or occupants that can monitor the driver and/or occupants to improve safety and improve user experience. In such a system, the data obtained from the interior camera (and thereafter processed using computer-vision techniques) may be used to modify or augment the behavior of the sound extraction and filtering. This modification or augmentation can serve to improve safety, to improve driver awareness, and to avoid driver distraction.

In other examples, the vehicle 102 may perform light-based communication with other vehicles or infrastructural components. For example, other vehicles may include headlights which may flash light patterns over a period of time. The vehicle 102 may use an optical device such as a photodiode and/or a complementary metal-oxide-semiconductor (CMOS)-based rolling shutter camera (not shown) to decode the light patterns that may vary with position and time to indicate that the vehicle 102 is performing a certain action, such as honking, or provide additional information to other vehicles or infrastructural elements. The disclosed systems may then use this information to generate emulated sounds corresponding to features of the observed action, which may be presented to the occupants 104. In some examples, various other modifications of the presented sound, Doppler shift, orientation, and/or alert information can be performed as needed.

The disclosed systems may also use the camera to detect various road conditions, for example the camera may be used to determine that the roads are wet or dry. The camera may be used to determine a weather condition. For example, the camera may be used to identify blown leaves and/or rain on the windshield of the vehicle 102. The disclosed systems can then use such information to determine that the weather is rainy. The disclosed systems may then use this information to generate emulated sounds corresponding to features of the weather condition (e.g., rainfall), that may be presented to the occupants. In some examples, the weather-based sounds may be modified (e.g., dampened) to suit the sensibilities of the occupants based on user-defined preferences. For example, the an AEB can be activated to display varying tire sounds, such as squeaking and crunching sounds that correspond with tires moving over snow, ice, water, leaves, and the like. In other examples, the disclosed systems may be configured to be in a racing mode, and can generate sounds to indicate that a particular tire may be slipping, while other tires have sufficient traction.

The vehicle 102 may be equipped with a V2X communication capability. In some examples, other vehicles in the proximity of the vehicle 102 may provide a direct alert of sound emission (sirens, honking horns) in the V2X transmissions to the vehicle 102. The other vehicles may detect sound emission around themselves and share such information with the vehicle. Nonlimiting examples of such information may include information associated with acoustic trilateration. Such information may use multiple vehicles to determine localization (for example, sound origin and/or directionality determination), as well as to determine sound intensity and Doppler shifting effects associated with the detected sounds. In other examples, the information may be used to improve sound extraction from the environment, and in particular, to improve sound extraction over background noises such as road noise, wind noise, and the like. In some examples, the disclosed systems may use any suitable security technique (e.g., encryption technique) to secure V2X communications and/or detected and generated audio. For example, such secure communications along with detection and generated audio can be used to protect the vehicle and associated systems from situations involving malicious actors. For example, such actors may transmit fraudulent audio files or V2X instructions to the detection systems of the vehicle. Accordingly, the disclosed systems can detect the fraudulent audio files or V2X instructions. Further, the disclosed systems can blacklist the source of the V2X sender, for example, by blacklisting the cryptographic key associated with the V2X sender.

As noted, the vehicle 102 may include various vehicle-based sensors. Nonlimiting examples of such sensors may include a wiper rain sensor and a traction control sensor. The disclosed systems may use the rain sensor to detect rain above some threshold and play a rain alert or ambient sounds within the vehicle's cabin. The disclosed systems may also use the traction control sensors to determine a loss of traction when the vehicle is traveling on icy terrain, is on a hydroplane, and/or the like and generate an audio-based alert within the cabin. In some examples, the disclosed systems may use an ADAS and/or an AV application to generate descriptions of what the vehicle senses and explanations as to why the disclosed systems perform certain actions (e.g. slow down due to rain). The disclosed systems can present the descriptions and/or explanations to users via a display or via audio, and may store the descriptions and/or explanation in storage for audit purposes.

The vehicle 102 may be in communication with various navigation or mapping databases. The disclosed systems may use such databases to obtain information associated with the area in which the vehicle is traveling. For example, the disclosed systems may use the databases to determine the noise floor level of an urban environment versus a rural environment. The disclosed systems may then filter out ambient or background sounds based on the determined noise floor level in the environment in which the vehicle is navigating. In other examples, the disclosed systems may use the databases to determine the presence of train tracks, underpasses, overpasses, wildlife areas, oceanic environments, and/or the like. Accordingly, the databases may serve to help the vehicle 102 both navigating the environment and determining sound information associated with the environment. For example, the disclosed systems may use the map data to determine sounds associated with trains coming on the train tracks and thereby notify the passengers of the vehicle 102 (e.g., via an audio alert played in the vehicle's cabin) about the possibility of a train crossing the vehicle's path. In other circumstances, a train may travel upon an overpass bridge. Further, the overpass bridge may be identified based on map information. The disclosed systems may determine that there can be no vehicle and train interaction due to the height difference between the routes of the train and the vehicle. In such a case, the vehicle may determine not to present audio or related information to the driver/passengers in the vehicle and thus, to not include train sounds in the presented audio to the driver and/or passengers of the vehicle.

The vehicle 102 may have various wireless connectivity and/or Internet of things (IoT) capabilities to determine various environmental data and/or information, which may serve in customizing the vehicles internal acoustic environment. Nonlimiting examples of such data and/or information may include whether information such as wind, rain, snow information and/or the like. For example, the vehicle 102 may communicate with various IOT devices disposed on various infrastructural components of the environment in which the vehicle is traveling and obtain any relevant information about the acoustic nature of the environment. This information may be used to generate sounds in the vehicle's interior emulating such an acoustic environment.

The disclosed systems may include processors that are capable of executing operations based on logic and algorithms. In some examples, the disclosed systems may perform sensor analysis. In particular, the disclosed systems may perform sensor analysis to determine a noise floor baseline based on sampled real-time sensor data. In some examples, the disclosed systems can detect the presence of an ongoing conversation or phone call in the vehicle. Accordingly, the disclosed systems may determine to not present certain sound types (e.g., ocean noises, bird chirping noises, etc.) while such conversations or phone calls are ongoing. The disclosed systems may further perform a comparison to a referenced noise-floor baseline using crowd-sourced geolocation data or information on an external database. This crowd-sourced geolocation data and/or information may be obtained from a cloud-based database (for example, a public cloud database, a private cloud database, and/or a hybrid cloud database).

The vehicle 102 may include systems that may perform sensor fusion of images and audio obtained by the vehicle 102 and/or any associated devices to determine sound types, directionality, distance, and/or the like. For example, the systems may perform acoustic trilateration. In some examples, the acoustic trilateration may be performed using three or more microphones. The microphones may be present on one vehicle or may be present on separate vehicles. In other examples, the microphones may be distributed among different vehicles which can communicate detected sounds using V2X communications. The acoustic trilateration may allow for sound source identification and acoustic signal extraction. In other examples, the disclosed systems may categorize sound types to alert users of emergent environmental situations. The disclosed systems may also enable users to modify preference settings reflecting desired and undesired sounds via an HMI menu 103. The disclosed systems may provide alerts, such as alarm sounds in certain critical conditions such as potential collision conditions. The disclosed systems may allow a user to control ambient sound presentation preferences, such as a preferred background noise level. The disclosed systems may also allow the user to specify desired and undesired sounds. As noted, the vehicle 102 may enable a variety of audio and alerts to be presented to users. For example, the vehicle 102 may enable audio alerts, ambient acoustic noises, visual alerts, haptic feedback, visual indications of the location of vehicles (for example on a HUD or center console display of a vehicle), and/or the like.

The vehicle 102 may include any suitable vehicle such as a motorcycle, car, truck, recreational vehicle, etc., and may be equipped with suitable hardware and software that enables it to communicate over a network, such as a local area network (LAN).

As noted, the vehicle 102 may include a variety of sensors that may aid the vehicle in determining an environment in which the vehicle is in. The sensors may include RADAR, LIDAR, cameras, magnetometers, ultrasound, barometers, and the like (to be described below). In one embodiment, the sensors and other devices of the vehicle 102 may communicate over one or more network connections. Examples of suitable network connections include a controller area network (CAN), a media-oriented system transfer (MOST), a local interconnection network (LIN), a cellular network, a Wi-Fi network, and other appropriate connections such as those that conform with known standards and specifications (e.g., one or more Institute of Electrical and Electronics Engineers (IEEE) standards, and the like).

As noted, the vehicles 102 may include various location-determination devices in addition to satellite-based location-determination devices. These devices may be used to identify the location of the vehicle, track the vehicle on a map (e.g., an HD map), track other vehicles in proximity to the vehicle, provide updates on the location of a given vehicle to other vehicles, and generally support the operations described herein. For example, the vehicle 102 may include magnetic positioning devices such as magnetometers, which may offer an indoor location determination capability. Magnetic positioning may be based on the iron inside buildings that create local variations in the Earth's magnetic field. Un-optimized compass chips inside devices in the vehicle 102 may sense and record these magnetic variations to map indoor locations. In one embodiment, the magnetic positioning devices may be used to determine the elevation of the vehicle 102. Alternatively or additionally, a barometer device may be used to determine the elevation of the vehicle 102. In another embodiment, barometers and pressure altimeters may be a part of the vehicle and may measure pressure changes caused by a change in altitude of the vehicles 102.

In one embodiment, the vehicle 102 may use one or more inertial measurement devices (not shown) to determine the respective vehicles' position in order to track the vehicles and/or to determine the location of various sound sources in the vehicle's environment with respect to a map (e.g., an HD map). The vehicles 102 may use dead reckoning and other approaches for positioning of the vehicle using an inertial measurement unit carried by the vehicles 102 sometimes referring to maps or other additional sensors to constrain the inherent sensor drift encountered with inertial navigation. In one embodiment, one or more microelectromechanical systems (MEMS) based inertial sensors may be used in the inertial measurement unit of the vehicle; however, the MEMS sensors may be affected by internal noises which may result in cubically growing position error with time. In one embodiment, to reduce the error growth in such devices, a Kalman filtering based approach may be used, by implementing software algorithms on software modules associated with the various devices in the vehicle 102.

In one embodiment, the inertial measurements may cover one or more differentials of motion of the vehicle 102, and therefore, the location may be determined by performing integration functions in the software modules, and accordingly, may require integration constants to provide results. Further, the position estimation for the vehicle 102 may be determined as the maximum of a two-dimensional or a three-dimensional probability distribution which may be recomputed at any time step, taking into account the noise model of all the sensors and devices involved. Based on the vehicles' motion, the inertial measurement devices may be able to estimate the vehicles' locations by one or more artificial intelligence algorithms, for example, one or more machine learning algorithms (e.g., convolutional neural networks). The disclosed systems may use any of the devices mentioned above in combination with the location-determination signals to determine the location of the vehicle, determine the location of other vehicles, and/or determine the location of various sound sources in the vehicle's environment.

In some examples, the disclosed systems can use an indoor positioning system (IPS) in connection with certain infrastructural components to determine the location of the sound sources and/or vehicles with increased accuracy. Further, the IPS may be used to determine the location of the vehicle on a map (e.g., an HD map), for example, in locations where satellite navigation signals are inadequate. In particular, an IPS may refer to a system to locate objects (e.g., the vehicle 102) inside a building such as a parking structure using lights, radio waves, magnetic fields, acoustic signals, or other sensory information collected by mobile devices (e.g., user devices or vehicle devices). IPS's may use different technologies, including distance measurement to nearby anchor nodes (nodes with known fixed positions, e.g. Wi-Fi and/or Li-Fi access points or Bluetooth beacons, magnetic positioning, and/or dead reckoning). Such IPSs may actively locate mobile devices and tags or provide ambient location or environmental context for devices to get sensed. In one embodiment, an IPS system may determine at least three independent measurements to unambiguously find a location of a particular vehicle 102 or a sound source.

In some examples, the vehicle antennas may include any suitable communications antenna. Some non-limiting examples of suitable communications antennas include Wi- Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, or the like. The communications antenna may be communicatively coupled to a radio component to transmit and/or receive signals, such as communications signals to and/or from the vehicles. For example, the disclosed systems may transmit signals to other vehicles to inform the other vehicles to take at least one action (e.g., brake, accelerate, make a turn, and/or the like) based on a determination of the state of the sound sources.

In some examples, the vehicle 102 may have on-board units (not shown) may include microcontrollers and devices that can communicate with each other in applications without a host computer. The on-board unit may use a message-based protocol to perform internal communications. Further, the on-board unit can cause a transceiver to send and receive messages (for example, vehicle-to-everything, V2X, messages) to and from infrastructural components and to other vehicles' on-board units.

Further, various devices of the vehicle 102 and/or infrastructural components (e.g., smart traffic signals, roadside units, IPS systems, and/or the like) may include any suitable radio and/or transceiver for transmitting and/or receiving radio frequency (RF) signals in the bandwidth and/or channels corresponding to the communications protocols utilized by any of the vehicle devices to communicate with each other and/or with infrastructural components. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n), 5 GHz channels (e.g. 802.11n, 802.11ac), or 60 GHZ channels (e.g. 802.11ad). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

Typically, when an example vehicle 102 establishes communication with another vehicle (not shown) and/or establishes communication with a infrastructural component device, the vehicle 102 may communicate in the downlink direction by sending data frames (e.g. a data frame which can comprise various fields such as a frame control field, a duration field, an address field, a data field, and a checksum field). The data frames may be preceded by one or more preambles that may be part of one or more headers. These preambles may be used to allow the user device to detect a new incoming data frame from the vehicle device. A preamble may be a signal used in network communications to synchronize transmission timing between two or more devices (e.g., between the vehicle 102 device and infrastructural component device and/or between the devices of separate vehicles). As noted, the data frames may be used to transmit information between vehicles so that a given vehicle may perform at least one action as a result of the detection of an on or off state of a sound source or the determined location of other vehicles (e.g., based on trilateration). Nonlimiting examples of such actions include breaking, turning, accelerating, turning on hazards, and/or the like.

In another aspect, the environmental context 100 may include one or more satellites 130 and one or more cellular towers 132. The satellites 130 and/or the cellular towers 132 may be used to obtain location information and/or to obtain information from various databases such as databases having HD maps. In other aspects, the disclosed systems may transmit information associated with sound sources and/or vehicles (e.g., the sound sources' respective locations, the sound sources' respective states, and/or the like). As noted, the vehicle 102 may have transceivers, which may in turn include one or more location receivers (e.g., global navigation satellite system (GNSS) receivers) that may receive location signals (e.g., GNSS signals) from one or more satellites 130. In another embodiment, a receiver may refer to a device that can receive information from satellites (e.g., satellites 130) and calculate the vehicles' geographical position.

In some examples, the vehicles (e.g., such as vehicle 102) may be configured to communicate using a network, wirelessly or wired. As noted, the communications may be performed between vehicles, for example, to inform a given vehicle to an action to take based on the state of a sound source. The network may include, but not limited to, any one of a combination of different types of suitable communications networks such as, for example, broadcasting networks, public networks (for example, the Internet), private networks, wireless networks, cellular networks, or any other suitable private and/or public networks. Further, any of the communications networks may have any suitable communication range associated therewith and may include, for example, global networks (for example, the Internet), metropolitan area networks (MANs), wide area networks (WANs), local area networks (LANs), or personal area networks (PANs). In addition, any of the communications networks may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

In some examples, the disclosed systems may analyze map information associated with an environment of the vehicles, previous vehicle locations in a given environment, sound source locations, infrastructural updates regarding the transportation network (for example, sound sources due to construction or other activities) and/or the like. The database may be controlled by any suitable system, including a database management system (DBMS), discussed further in connection with FIG. 6, below. The DBMS may use any of a variety of database models (for example, relational model, object model, etc.) and may support any of a variety of query languages to obtain information from the database. In some examples, the database may include a cloud-based database or a vehicle-based database.

Certain embodiments of the disclosure are now described in the context of an example non-limiting scenario. The scenario can include users traveling in a luxury vehicle, the users having preferences that indicate a fondness for sounds associated with nature. The users may provide input to the disclosed systems indicative of a preference for a generally quiet vehicle cabin. However, the users may also indicate a desire to hear certain environmental sounds, such as birds chirping along rural drives.

In this example scenario, the disclosed systems (e.g., the vehicle and/or vehicle-based devices) may detect a base noise floor associated with the exterior environment. The disclosed systems may reduce external unwanted (for example, road noise, engine noise, traffic, and the like) using noise cancellation techniques. In some cases, the disclosed systems may perform noise suppression of sounds that are disliked based on previously indicated user preferences. The disclosed systems may perform the noise reduction using a user selection of predetermined sound-level preferences or a user-customized sound-level preference. In other examples, the system may learn a user's sound preferences using feedback from the user and the use of a machine learning algorithm such as a Gaussian process. The disclosed systems may use a vehicle's interior and exterior microphones along with AI-based techniques (for example, machine learning and/or deep learning techniques) to allow near real-time acoustic signature identification of external sounds. For example, the disclosed systems may use such techniques to identify the most common birds and their associated chirps for the region the vehicle is currently located in. For example, the disclosed systems can look up the birds and associated chirps from an external database accessible via the vehicle's communication systems and using associated vehicle antennae. The location may be determined using communication with an external database and/or via GPS receivers. The disclosed systems may then play emulated chirp sounds matching the identified chirps of such birds in the vehicle's cabin.

In some examples, the disclosed systems may use a vehicle's cameras and use AI-based techniques (for example, machine learning and/or deep learning techniques) to allow near real time visual identification of certain external objects. In some examples, the disclosed systems can use the visual identification to present information associated with the objects to the users. For example, the disclosed systems may allow for the visual identification of the most common birds in the region the vehicle is currently navigating. The disclosed systems may obtain information associated with the birds from external databases and may then present information associated with such birds along with pictures and/or videos of the birds to the vehicle's occupants. In some examples, the information may be presented on any suitable display of the vehicle. Alternatively or additionally, the information may be presented via audio at the vehicle's speakers, for example, using a text-to-speech engine. In other examples, the disclosed systems may use the vehicle's infotainment system for processing and filtering the external sounds, thereby allowing the near real time playback of a portion of the sounds (e.g., targeted bird chirps).

Further embodiments of the disclosure are now described in the context of another example non-limiting scenario. This scenario can include a luxury vehicle driving on a scenic coastal drive. Further, the occupants of the luxury vehicle may prefer a generally quiet vehicle cabin. However, the occupants may prefer to hear the ocean's natural sounds during their drive.

In this example, the disclosed systems may detect a base noise floor associated with the exterior environment. The disclosed systems may reduce external unwanted (for example, road noise, engine noise, traffic, and the like) using noise cancellation techniques. The disclosed systems may perform the noise reduction using a user selection of predetermined sound-level preferences or a user-customized sound-level preference.

Continuing with this example, the disclosed systems may use navigation and mapping data to determine the vehicle's current location with respect to oceans and/or waterways. For instance, the disclosed systems may determine the distance between the vehicle's location and the ocean and/or waterway and calculate the effect of the distance on the sound decibel level. The disclosed systems may similarly identify wind and weather information to determine the external environment's likely impact on real-world audio feedback. The disclosed systems may also use the information to determine the relationship between a sound decibel level of ocean and/or waterway versus the distance from ocean and/or waterway.

In another example, a driver may be an accomplished classically trained violinist (e.g. named "Meira"). The disclosed systems may learn (e.g., via machine learning) the driver's preferences such that the disclosed systems filter out external music disliked by the driver (e.g. vocal medieval chants), and present extracted sounds enjoyed by the driver (e.g., Shostakovich symphony No. 5 in D minor, Prokofiev violin concerto No. 1 in D major, Schubert string quartet No. 14 in D minor, Sibelius violin concerto in D minor, etc.) when the user drives in proximity to such sounds.

The disclosed systems may use a vehicle's interior and exterior microphones along with AI-based techniques (for example, machine learning and/or deep learning techniques) to allow near real-time acoustic signature identification of external sounds. For example, the disclosed systems may use such techniques to identify typical wave and ocean current sounds. The disclosed systems may then play emulated wave and ocean current sounds matching the identified typical wave and ocean current sounds in the vehicle's cabin. The disclosed systems may use a vehicle's cameras and use AI-based techniques to allow near real time visual identification of visible coastal regions, as well as the status, spacing, and order of ocean waves to allow appropriate synchronization of audio processing. The disclosed systems may use the vehicle's infotainment system processing and filtering capabilities to allow for the near real-time playback of targeted wave and ocean current sounds.

In certain aspects, the disclosed systems may operate with a vehicle designated to be in a race mode or sport mode of operation. In these situations, the disclosed systems may reduce or remove road or engine noise on the way to the track, but allow all road and engine noise to be heard when at the track or amplify other engine noise from other vehicles to enhance the auditory experience of the driver or passengers. In some examples, the disclosed systems may further enhance the road noise as compared to a traditional vehicle. For example, a wheel may be taken to its traction limit such that slip may occur to generate squealing noises. This squeal sound may propagate through the vehicle's body such that determining which individual wheel has lost traction may be difficult to determine relative to the noise floor and other dampening effects. The disclosed embodiments can enable the vehicle to detect wheel slip from a vehicle control module and via audio detection of an individual wheel. Further, the disclosed systems can present an improved audio signal (e.g., denoised or artificial audio signal) to improve a driver's situational awareness.

In other aspects, the disclosed systems may provide assistance for the deaf and individuals with hearing loss. For example, the disclosed systems may alert those that cannot hear exterior sounds with a visual alert of important road sounds. For examples, a deaf occupant may be alerted to an emergency vehicle's position, speed, and proximity through a visual alert.

Figure 2:
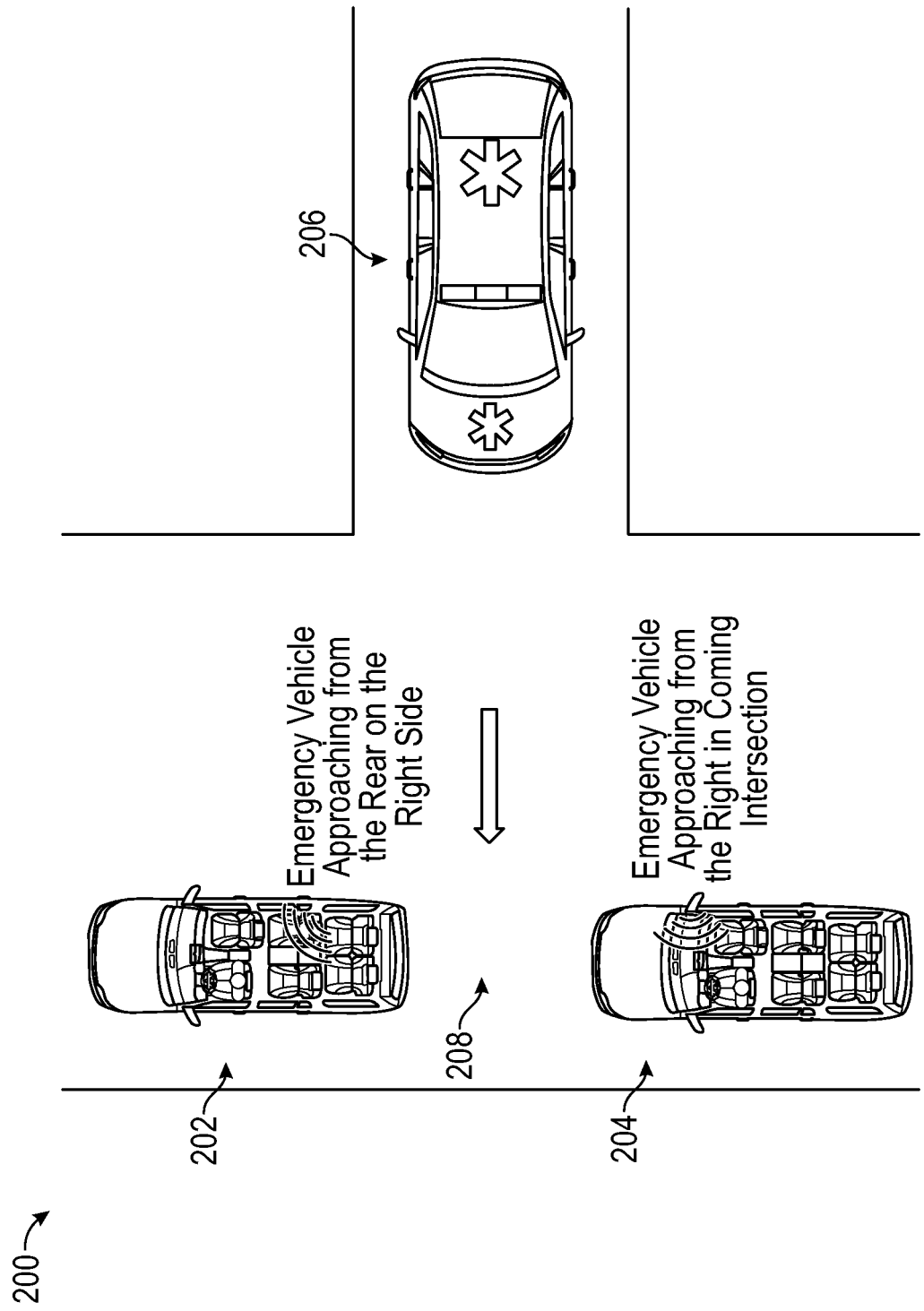
FIG. 2 shows one example scenario in which acoustic control of a vehicle's interior can provide a driver with increased situational awareness, in accordance with example embodiments of the disclosure.

Another embodiment of the disclosure is now described in the context of another example non-limiting scenario. FIG. 2 shows one example scenario in which acoustic control of a vehicle's interior can provide a driver with increased situational awareness, in accordance with example embodiments of the disclosure. This scenario can include a vehicle 202 in proximity to an active emergency vehicle 206 on an intersection 208. There may be other vehicles (e.g., vehicle 204) also in proximity to the vehicle 202. In this case, the vehicle's occupants may prefer a quiet vehicle cabin. However, the vehicle's occupants may also need to be made aware of the presence, heading, and/or speed of any nearby active emergency vehicles such as active emergency vehicle 206.

In this case, the disclosed systems may detect a base noise floor associated with the exterior environment. The disclosed systems may reduce external unwanted (for example, road noise, engine noise, traffic, and the like) using noise cancellation techniques. The disclosed systems may again perform the noise reduction using a user selection of predetermined sound level preferences or a user customized sound level preferences.

In some embodiments, the vehicle 202 may use any suitable V2V protocol to detect nearby emergency vehicles (e.g., active emergency vehicle 206) within a predetermined radius of the vehicle 202. The disclosed systems may use a vehicle's 202 interior and exterior microphones along with AI-based techniques to allow near real-time acoustic signature identification of external sounds. For example, the disclosed systems may use such techniques to identify typical emergency vehicle 206 sounds and siren patterns.

The disclosed systems may use a vehicle's 202 cameras and use AI-based techniques to allow near real time visual identification of certain external objects such as the active emergency vehicle 206. In some examples, the disclosed systems can use the visual identification to present information associated with the objects to the users. For example, the disclosed systems may allow for the visual identification visible emergency vehicle lights and signature color and timing patterns associated with the active emergency vehicle 206. The disclosed systems may then present information associated with the active emergency vehicle 206 along with pictures and/or videos of the emergency vehicle 206 to the vehicle's 202 occupants. In some examples, the information may be presented on any suitable display of the vehicle 202.

In some examples, the disclosed systems may also use the vehicle's 202 cameras to determine the distance and path of visible emergency vehicle lighting associated with the active emergency vehicle 206. In other examples, the disclosed systems may use the vehicle's 202 infotainment system for processing and filtering the external sounds, thereby allowing the near real time playback of the active emergency vehicle's 206 siren. The disclosed systems can play the emulated emergency sirens to include the directionality of the siren as well as include Doppler effects for increasing the users' perception of the realism and intuitiveness of the siren sounds location. Along with the playback of the active emergency vehicle's 206 siren, the vehicle's 202 interior HMI could also indicate the direction and path of the identified active emergency vehicle 206 for improved safety and awareness, as shown and described in connection with FIG. 3, below. In particular, a heads-up display or infotainment display associated with the vehicle 202 can be used for the display of the active emergency vehicle's 206 location and to provide warning notifications.

As noted, the disclosed systems may enable acoustic trilateration of external sound sources. In some examples, such external sound sources may not have sufficient corresponding visual cues. For example, the external sound sources may include a honking horn, a whistle from police officer directing traffic, and/or the like. The disclosed systems may use acoustic trilateration to facilitate vision-based identification of sound sources. In some examples, a particular form of trilateration can be used with acoustic sampling of the external environment to attempt to narrow down the direction from where the sound originates. Such trilateration may be useful for identifying the location of sounds from vehicles that cannot communicate via V2V protocols. Such vehicles (for example, older emergency vehicles) may not be able to properly identify themselves. However, such vehicles may be occluded or lack visual cues to identify them visually by a driver or by a vehicle camera.

Accordingly, the disclosed systems can identify such sound sources using vehicle-based microphones. In particular, the disclosed systems may use the microphones to sample external sounds. Alternatively or additionally, the disclosed systems may receive sampled and normalized external sounds using an external device and/or via a V2V communication. The disclosed systems can process the external sound, characterize the sound via its acoustic signature, and analyze the external sound to estimate the approximate sound pressure level as sampled. Further, the disclosed systems may broadcast this information to any other V2V-capable vehicles in proximity.

In some examples, if at least three messages of this type are received by a V2V capable vehicle, the approximate location of the origination point of the sound can be determined. The disclosed systems may perform such a determination using trilateration techniques and a map database. The map database may include sounds characterized as being most likely to have emanated from a vehicle (e.g. honking horn, screeching tires, and/or the like).

In an example scenario, an acoustic-trilateration capable vehicle can receive a V2V message from two other vehicles broadcasting messages having a sound pressure level of a corresponding sampled sound and the sampled sound's characterization type. The receiving vehicle can pair the V2V information with its own sampling and characterization information to determine where the location of the sound originated from. In particular, because the receiving vehicle knows its own location, as well as the location of the two other vehicles, the vehicle can use trilateration techniques to make the location determination. Further, in the case of vehicle-emanated sounds, the disclosed systems may further incorporate relevant knowledge of road geometry (for example, as determined from an external database) to make the location determination.

Figure 3:
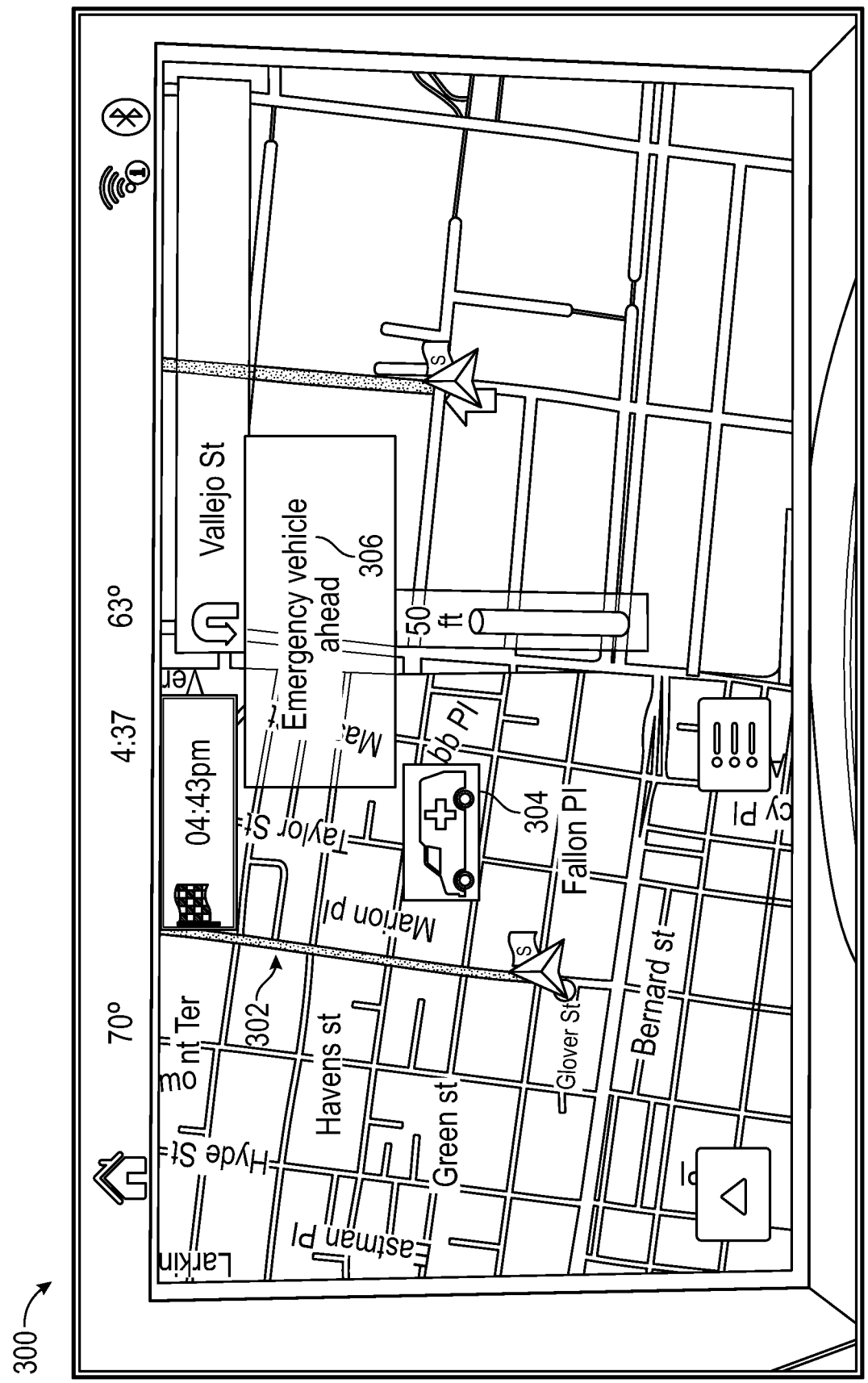
FIG. 3 shows a diagram of providing passengers with mapping capabilities for improving a driver's situational awareness for the example scenario described in FIG. 2, in accordance with example embodiments of the disclosure.

FIG. 3 shows a diagram 300 of providing passengers with mapping capabilities for improving a driver's situational awareness for the example scenario described in FIG. 2, in accordance with example embodiments of the disclosure. As noted, the disclosed systems may also present visual alerts based on the detected environmental sounds, the visual alerts presented to vehicle occupants in addition to or in substitute for the environmental sounds. The disclosed systems may generate and present such visual alerts 306 on a vehicle's heads-up displays, center console displays, and/or the like. The disclosed systems may also present the visual alerts alongside onboard map information 302 showing the vehicle's current location. For example, the disclosed systems may present the visual alerts on a virtual map to denote the location of the sound along with other driving information (for example, a vehicle's heading, speed, and/or the like).

Figure 4:
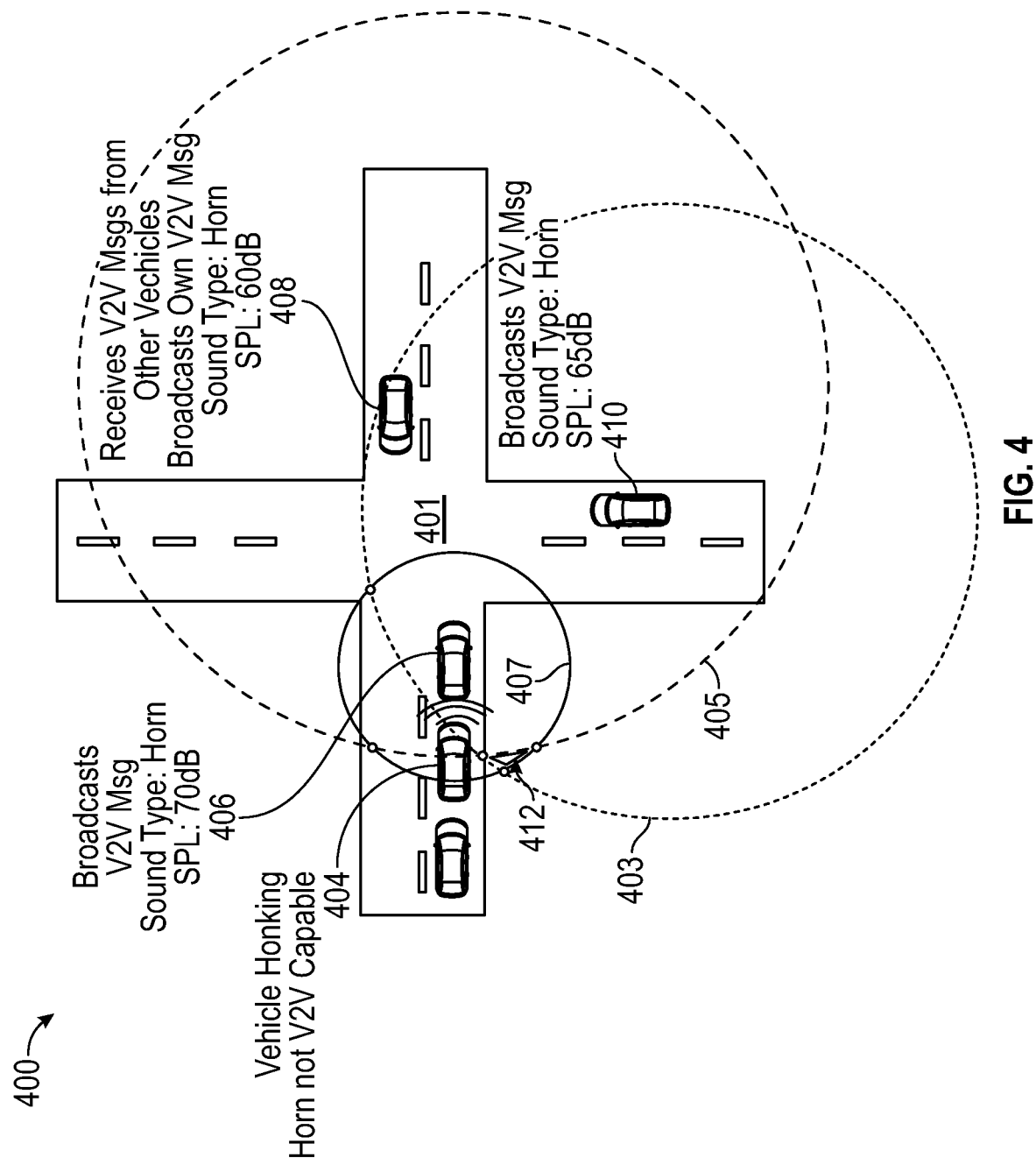
FIG. 4 shows an example scenario in which the disclosed systems and methods can perform acoustic trilateration to locate an external sound source, in accordance with example embodiments of the disclosure.

FIG. 4 shows an example scenario in which the disclosed systems and methods can perform acoustic trilateration to locate an external sound source, in accordance with example embodiments of the disclosure. Diagram 400 shows four vehicles (vehicles 404, 406, 408, and 410) at an intersection 401, with three of the vehicles (vehicles 406, 408, and 410) being V2V capable, and one vehicle (vehicle 404) which is not V2V capable. As described below, the vehicle 404, which may not be V2V capable, can still be identified as the origination of the honk sound. Any of the V2V-capable vehicles can broadcast their own messages identifying themselves as the vehicle which is honking. However, with acoustic trilateration, V2V-capable vehicles can collectively sample the audio, characterize, and broadcast the sampled level to each other for any of them to make their own determination of the location of the audio source.

The location-determination process can include processing the broadcasted data and GPS locations of the three samples to produce possible ranges of where the origination point of the sound may reside. This can be represented by circles 403, 405, and 407 of FIG. 4, which can represent areas in which audio can be sampled by each respective vehicles' external microphone. The vehicle 410 on the south side of the intersection can sample the sound, characterize sound as a vehicle horn via its acoustic signature, and can determine that sound was sampled at a given amplitude (for example, about 65 dB).

Continuing with this example, the vehicle 406 on the west side of the intersection 401 can perform the same procedure to determine that the sound has a different amplitude, for example, an amplitude of about 70 dB. The vehicle 408 on the east side of the intersection 401 can take the data from the two other vehicles and combines the data with its own sample of about 60 dB to determine that the honking vehicle 404 may be on the west side of the intersection 401. The clustering of intersection points 412 may be approximately off to the side of the road, but the knowledge of the road geometry via an on-board map database can result in the east-side vehicle 408 being able to determine (via map identification) that the honking vehicle 404 is most likely the vehicle directly behind the V2V-capable vehicle 406 on the west side of the intersection 401. For vehicles with multiple microphones separated on either side of a given sampling vehicle, the distance ranges and sounds source orientation can be even more precise and less prone to error. However, a single microphone can still properly determine the source location with data from at least two other vehicles as depicted in diagram 400.

As noted, any one of the other vehicles (vehicles 406, 408, and/or 410) that make their own determination of the honking-vehicle's 404 location through acoustic trilateration may subsequently broadcast corresponding information to be shared with the other vehicles. The disclosed systems can average the values of these determined locations to further increase the accuracy and confidence of the location determination.

Figure 5:
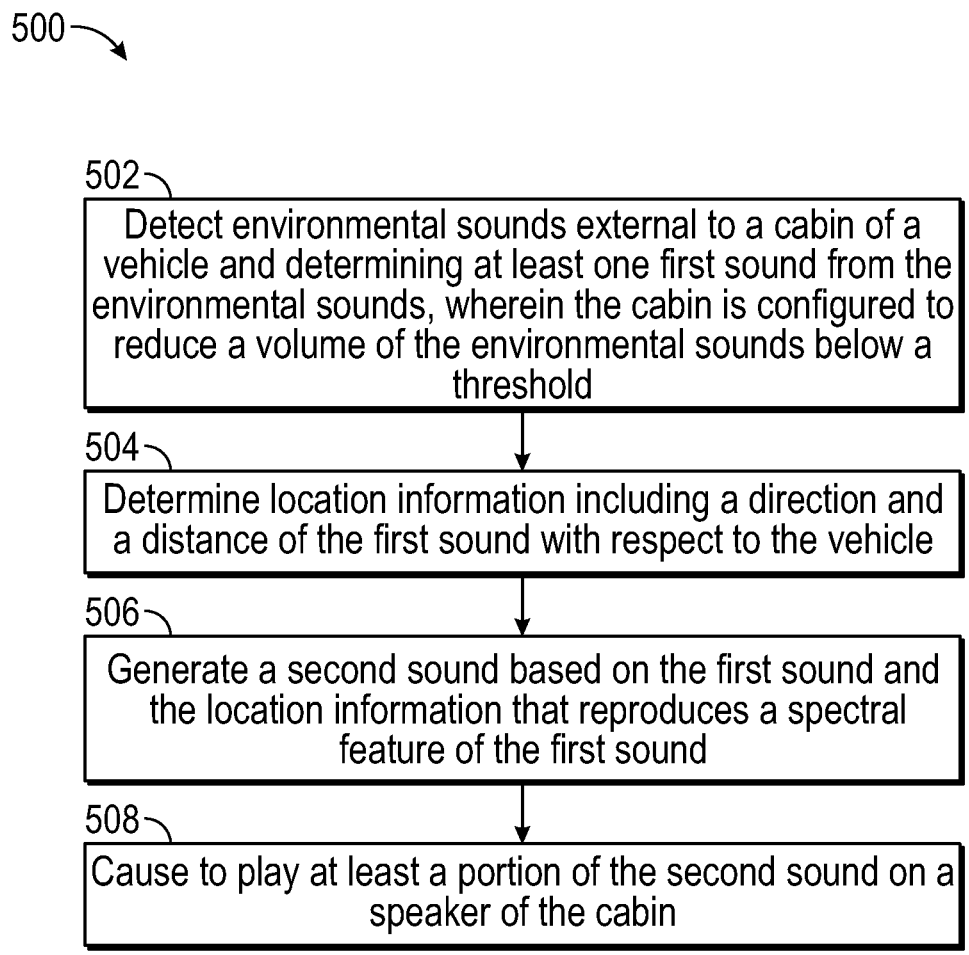
FIG. 5 shows an example process flow describing a method for providing acoustic control of a vehicle's interior, in accordance with example embodiments of the disclosure.

FIG. 5 shows an example process flow describing a method of generating a customized acoustic environment in a vehicle, in accordance with example embodiments of the disclosure. At block 502, the method may include detecting environmental sounds external to a cabin of a vehicle and determining at least one first sound from the environmental sounds, wherein the cabin is configured to reduce a volume of the environmental sounds below a threshold. In some examples, determining the first sound can include determining a plurality of sounds and respective sound types from the environmental sounds, and filtering out sounds having predetermined sound types from the environmental sounds. Further, determining the sound types can include assigning respective priorities to the sounds. For example, sounds filtering out sounds further comprise filtering out sounds that have priorities below respective thresholds.

At block 504, the method may include determining location information including a direction and a distance of the first sound with respect to the vehicle. In some examples, determining the location information may include performing acoustic trilateration using V2V communications with other vehicles configured to detect the environmental sounds. Further, determining the location information may include determining a Doppler shift associated with the first sound.

At block 506, the method may include generating a second sound based on the first sound and the location information that reproduces a spectral feature of the first sound. In one example, spectral features can include frequency-based features of a signal. In particular, such spectral features can be determined by converting the time-based signal (e.g., an audio signal) into the frequency domain using a Fourier transform algorithm. Non-limiting examples of such spectral features can include a fundamental frequency, one or more frequency components, a spectral density, a spectral roll-off, and/or the like. Various combinations of spectral features can be used to identify the notes, pitch, timbre, bass, rhythm, melody, etc. of a particular portion of an audio signal.

In other embodiments, generating the second sound may include reducing noise associated with the first sound by an amount that can be based on a user preference.

At block 508, the method may include causing to play at least a portion of the second sound on a speaker of the cabin. In some examples, causing to play at least the portion of the second sound may include projecting the second sound such that the second sound has a perceived location that is similar to the first sound. Further, the method may include causing to present an image based on the second sound on a display associated with the cabin. In other examples, the method can include obtaining images of an environment external to the cabin and determining a condition (e.g., emergency condition) based on an analysis of the images. Accordingly, the disclosed systems can stop playing the portion of the second sound and can play a third sound on the speaker based on the images.

As noted, embodiments of devices and systems (and their various components) described herein can employ AI to facilitate automating one or more features described herein, for example, in performing sound detection and recognition from audio captured by the microphone(s) of a vehicle and performing sound localization. The components can employ various AI-based schemes for carrying out various embodiments and/or examples disclosed herein. To provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system, environment, etc. from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether the events are correlated in close temporal proximity, and whether the events and data come from one or several event and data sources (e.g., different sensor inputs). Components disclosed herein can employ various classification (explicitly trained (e.g., via training data) as well as implicitly trained (e.g., via observing behavior, preferences, historical information, receiving extrinsic information, etc.)) schemes and/or systems (e.g., support vector machines, neural networks, expert systems, Bayesian belief networks, fuzzy logic, data fusion engines, etc.) in connection with performing automatic and/or determined action in connection with the claimed subject matter. Thus, classification schemes and/or systems can be used to automatically learn and perform a number of functions, actions, and/or determinations.

A classifier can map an input attribute vector, z=(z1, z2, z3, z4, . . . , zn), to a confidence that the input belongs to a class, as by f(z)=confidence(class). Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, neural networks, fuzzy logic models, and/or probabilistic classification models providing different patterns of independence can be employed. Classification as used herein also is inclusive of statistical regression that is utilized to develop models of priority.

Figure 6:
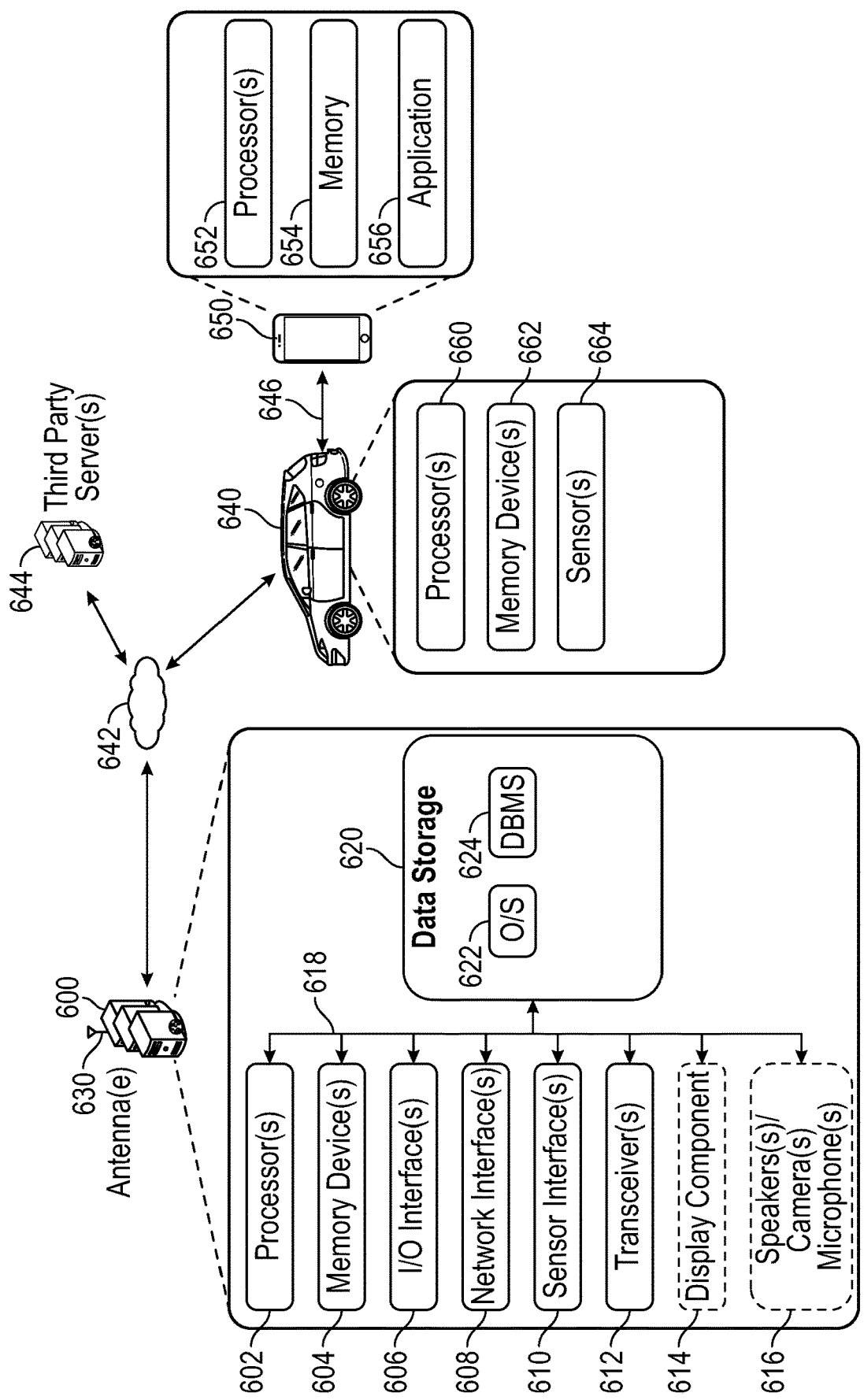
FIG. 6 is a schematic illustration of an example server architecture for one or more servers that can be used for providing acoustic control of a vehicle's interior, in accordance with one or more embodiments of the disclosure.

FIG. 6 is a schematic illustration of an example server architecture for one or more server(s) 600 in accordance with one or more embodiments of the disclosure. The server 600 illustrated in the example of FIG. 6 may correspond to a server that may be used by a vehicle (for example, any of vehicle 102 as shown and described in connection with FIG. 1, above) on a network associated with the vehicle. In an embodiment, the server 600 may include a cloud-based server that may serve to store and transmit information (for example, HD map information including the location of light sources such as traffic signals, traffic information, and the like). Some or all of the individual components may be optional and/or different in various embodiments. In some embodiments, at least one of the servers described FIG. 6 may be located at an autonomous vehicle.

The server 600 may be in communication with an AV 640, and one or more user devices 650. The AV 640 may be in communication 646 with the one or more user devices 650. Further, the server 600, the AV 640, and/or the user devices 650 may be configured to communicate via one or more networks 642. The AV 640 may additionally be in wireless communication over one or more network(s) 642 with the user devices 650 via a connection protocol such as Bluetooth or NFC. Such network(s) 642 may include, but are not limited to, any one or more different types of communications networks such as, for example, cable networks, public networks (for example, the Internet), private networks (for example, frame-relay networks), wireless networks, cellular networks, telephone networks (for example, a public switched telephone network), or any other suitable private or public packet-switched or circuit-switched networks. Further, such network(s) may have any suitable communication range associated therewith. In addition, such network(s) may include communication links and associated networking devices (for example, link-layer switches, routers, etc.) for transmitting network traffic over any suitable type of medium including, but not limited to, coaxial cable, twisted-pair wire (for example, twisted-pair copper wire), optical fiber, a HFC medium, a microwave medium, a radio frequency communication medium, a satellite communication medium, or any combination thereof.

In an illustrative configuration, the server 600 may include one or more processors 602, one or more memory devices 604 (also referred to herein as memory 604), one or more input/output (I/O) interface(s) 606, one or more network interface(s) 608, one or more sensor(s) or sensor interface(s) 610, one or more transceiver(s) 612, one or more optional display components 614, one or more optional speakers(es)/camera(s)/microphone(s) 616, and data storage 620. The server 600 may further include one or more bus(es) 618 that functionally couple various components of the server 600. The server 600 may further include one or more antenna(e) 630 that may include, without limitation, a cellular antenna for transmitting or receiving signals to/from a cellular network infrastructure, a GNSS antenna for receiving GNSS signals from a GNSS satellite, a Bluetooth antenna for transmitting or receiving Bluetooth signals, an NFC antenna for transmitting or receiving NFC signals, and so forth. These various components will be described in more detail hereinafter.

The bus(es) 618 may include at least one of a system bus, a memory bus, an address bus, or a message bus, and may permit the exchange of information (for example, data (including computer-executable code), signaling, etc.) between various components of the server 600. The bus(es) 618 may include, without limitation, a memory bus or a memory controller, a peripheral bus, an accelerated graphics port, and so forth. The bus(es) 618 may be associated with any suitable bus architecture.

The memory 604 of the server 600 may include volatile memory (memory that maintains its state when supplied with power) such as RAM and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (for example, FRAM) may enable faster read/write access than certain types of volatile memory.

The data storage 620 may include removable storage and/or non-removable storage including, but not limited to, magnetic storage, optical disk storage, and/or tape storage. The data storage 620 may provide non-volatile storage of computer-executable instructions and other data.

The data storage 620 may store computer-executable code, instructions, or the like that may be loadable into the memory 604 and executable by the processor(s) 602 to cause the processor(s) 602 to perform or initiate various operations. The data storage 620 may additionally store data that may be copied to the memory 604 for use by the processor(s) 602 during the execution of the computer-executable instructions. More specifically, the data storage 620 may store one or more operating systems (O/S) 622; one or more database management systems (DBMS) 624; and one or more program module(s), applications, engines, computer-executable code, scripts, or the like. Some or all of these component(s) may be sub-component(s). Any of the components depicted as being stored in the data storage 620 may include any combination of software, firmware, and/or hardware. The software and/or firmware may include computer-executable code, instructions, or the like that may be loaded into the memory 604 for execution by one or more of the processor(s) 602. Any of the components depicted as being stored in the data storage 620 may support functionality described in reference to corresponding components named earlier in this disclosure.

The processor(s) 602 may be configured to access the memory 604 and execute the computer-executable instructions loaded therein. For example, the processor(s) 602 may be configured to execute the computer-executable instructions of the various program module(s), applications, engines, or the like of the server 600 to cause or facilitate various operations to be performed in accordance with one or more embodiments of the disclosure. The processor(s) 602 may include any suitable processing unit capable of accepting data as input, processing the input data in accordance with stored computer-executable instructions, and generating output data. The processor(s) 602 may include any type of suitable processing unit.

Referring now to other illustrative components depicted as being stored in the data storage 620, the O/S 622 may be loaded from the data storage 620 into the memory 604 and may provide an interface between other application software executing on the server 600 and the hardware resources of the server 600.

The DBMS 624 may be loaded into the memory 604 and may support functionality for accessing, retrieving, storing, and/or manipulating data stored in the memory 604 and/or data stored in the data storage 620. The DBMS 624 may use any of a variety of database models (for example, relational model, object model, etc.) and may support any of a variety of query languages.

Referring now to other illustrative components of the server 600, the input/output (I/O) interface(s) 606 may facilitate the receipt of input information by the server 600 from one or more I/O devices as well as the output of information from the server 600 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. The I/O interface(s) 606 may also include a connection to one or more of the antenna(e) 630 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The server 600 may further include one or more network interface(s) 608 via which the server 600 may communicate with any of a variety of other systems, platforms, networks, devices, and so forth. The network interface(s) 608 may enable communication, for example, with one or more wireless routers, one or more host servers, one or more web servers, and the like via one or more networks.

The sensor(s)/sensor interface(s) 610 may include or may be capable of interfacing with any suitable type of sensing device such as, for example, inertial sensors, force sensors, thermal sensors, photocells, and so forth.

The display component(s) 614 may include one or more display layers, such as LED or LCD layers, touch screen layers, protective layers, and/or other layers. The optional camera(s) of the speakers(s)/camera(s)/microphone(s) 616 may be any device configured to capture ambient light or images. The optional microphone(s) of the speakers(s)/camera(s)/microphone(s) 616 may be any device configured to receive analog sound input or voice data. The microphone(s) of the speakers(s)/camera(s)/microphone(s) 616 may include microphones used to capture sound.

It should be appreciated that the program module(s), applications, computer-executable instructions, code, or the like depicted in FIG. 6 as being stored in the data storage 620 are merely illustrative and not exhaustive and that processing described as being supported by any particular module may alternatively be distributed across multiple module(s) or performed by a different module.

It should further be appreciated that the server 600 may include alternate and/or additional hardware, software, or firmware components beyond those described or depicted without departing from the scope of the disclosure.

The user device 650 may include one or more computer processor(s) 652, one or more memory devices 654, and one or more applications, such as a vehicle application 656. Other embodiments may include different components.

The processor(s) 652 may be configured to access the memory 654 and execute the computer-executable instructions loaded therein. For example, the processor(s) 652 may be configured to execute the computer-executable instructions of the various program module(s), applications, engines, or the like of the device to cause or facilitate various operations to be performed in accordance with one or more embodiments of the disclosure. The processor(s) 652 may include any suitable processing unit capable of accepting data as input, processing the input data in accordance with stored computer-executable instructions, and generating output data. The processor(s) 652 may include any type of suitable processing unit.

The memory 654 may include volatile memory (memory that maintains its state when supplied with power). Persistent data storage, as that term is used herein, may include non-volatile memory. In certain example embodiments, volatile memory may enable faster read/write access than non-volatile memory. However, in certain other example embodiments, certain types of non-volatile memory (for example, FRAM) may enable faster read/write access than certain types of volatile memory.

Referring now to functionality supported by the user device 650, the AV application 656 may be a mobile application executable by the processor 652 that can be used to present options and/or receive user inputs of information related to the disclosed embodiments. In addition, the user device 650 may communicate with the AV 640 via the network 642 and/or a direct connect, which may be a wireless or wired connection. The user device 650 may include a camera, scanner, bio reader or the like to capture biometric data of a user, perform certain processing steps on the biometric date, such as extracting features from captured biometric data, and then communicated those extracted features to one or more remote servers, such as one or more of cloud-based servers.

It should be appreciated that the program module(s), applications, computer-executable instructions, code, and/or the like depicted in FIG. 6 as being stored in the data storage 620 are merely illustrative and not exhaustive and that processing described as being supported by any particular module may alternatively be distributed across multiple module(s) or performed by a different module.

NON The autonomous vehicle 640 may include one or more computer processor(s) 660, one or more memory devices 662, one or more sensors 664, and one or more applications, such as an autonomous driving application 666. Other embodiments may include different components. A combination or sub combination of these components may be integral to the controller 606 in FIG. 6.

The processor(s) 660 may be configured to access the memory 662 and execute the computer-executable instructions loaded therein. For example, the processor(s) 660 may be configured to execute the computer-executable instructions of the various program module(s), applications, engines, or the like of the device to cause or facilitate various operations to be performed in accordance with one or more embodiments of the disclosure. The processor(s) 660 may include any suitable processing unit capable of accepting data as input, processing the input data in accordance with stored computer-executable instructions, and generating output data. The processor(s) 660 may include any type of suitable processing unit.

The memory 662 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

It should further be appreciated that the server 600 may include alternate and/or additional hardware, software, or firmware components beyond those described or depicted without departing from the scope of the disclosure.

EXAMPLE EMBODIMENTS

In some instances, the following examples may be implemented together or separately by the systems and methods described herein.

Example 1 may include a device, comprising: at least one memory device that stores computer-executable instructions; and at least one processor configured to access the at least one memory device, wherein the at least one processor is configured to execute the computer-executable instructions to: determine at least one first sound from environmental sounds external to a cabin of a vehicle, wherein the cabin is configured to reduce a volume of the environmental sounds below a threshold; determine location information comprising a direction and a distance of the first sound with respect to the vehicle; generate a second sound based on the first sound and the location information that reproduces a spectral feature of the first sound; and cause at least a portion of the second sound to play on a speaker of the cabin.

Example 2 may include the device of example 1 and/or some other example herein, wherein generating the second sound comprises reducing noise associated with the first sound by an amount that is based on a user preference.

Example 3 may include the device of example 1 and/or some other example herein, wherein determining the first sound comprises: determining a plurality of sounds and respective sound types from the environmental sounds; and filtering out sounds having predetermined sound types from the environmental sounds.

Example 4 may include the device of example 3 and/or some other example herein, wherein determining the sound types comprises assigning respective priorities to the sounds, and wherein filtering out sounds further comprises filtering out sounds that have priorities below respective thresholds.

Example 5 may include the device of example 1 and/or some other example herein, wherein determining the location information comprises performing acoustic trilateration using vehicle-to-vehicle (V2V) communications with other vehicles configured to detect the environmental sounds.

Example 6 may include the device of example 1 and/or some other example herein, wherein determining the location information comprises determining a Doppler shift associated with the first sound.

Example 7 may include the device of example 1 and/or some other example herein, wherein causing to play at least the portion of the second sound comprises projecting the second sound such that the second sound has a perceived location that is similar to the first sound.

Example 8 may include the device of example 1 and/or some other example herein, further comprising causing to present an image based on the second sound on a display associated with the cabin.

Example 9 may include the device of example 1 and/or some other example herein, wherein the computer-executable instructions further comprise computer-executable instructions to: obtain at least one image of an environment external to the cabin; determine an emergency condition based on an analysis of the image; cause to stop playing the portion of the second sound; and cause to play a third sound on the speaker based on the image.

Example 10 may include a method, comprising: detecting environmental sounds external to a cabin of a vehicle and determining at least one first sound from the environmental sounds, wherein the cabin is configured to reduce a volume of the environmental sounds below a threshold; determining location information comprising a direction and a distance of the first sound with respect to the vehicle; and generating a second sound based on the first sound and the location information that reproduces a spectral feature of the first sound.

Example 11 may include the method of example 10 and/or some other example herein, wherein generating the second sound comprises reducing noise associated with the first sound by an amount that is based on a user preference.

Example 12 may include the method of example 10, and/or some other example herein wherein determining the first sound comprises: determining a plurality of sounds and respective sound types from the environmental sounds; and filtering out sounds having predetermined sound types from the environmental sounds.

Example 13 may include the method of example 10 and/or some other example herein, wherein determining the location information comprises performing acoustic trilateration using vehicle-to-vehicle (V2V) communications with other vehicles configured to detect the environmental sounds.

Example 14 may include the method of example 10 and/or some other example herein, further comprising causing to present an image based on the second sound on a display associated with the cabin.

Example 15 may include the method of example 10 and/or some other example herein, further comprising: obtaining at least one image of an environment external to the cabin; determining a condition based on an analysis of the image; causing to stop playing the portion of the second sound; and causing to play a third sound on the speaker based on the image.

Example 16 may include a non-transitory computer-readable medium storing computer-executable instructions which, when executed by a processor, cause the processor to perform operations comprising: determining at least one first sound from environmental sounds external to a cabin of a vehicle, wherein the cabin is configured to reduce a volume of the environmental sounds below a threshold; determining location information comprising a direction and a distance of the first sound with respect to the vehicle; and generating a second sound based on the first sound and the location information that reproduces a spectral feature of the first sound.

Example 17 may include the non-transitory computer-readable medium of example 16 and/or some other example herein, wherein generating the second sound comprises reducing noise associated with the first sound by an amount that is based on a user preference.

Example 18 may include the non-transitory computer-readable medium of example 16 and/or some other example herein, wherein determining the first sound comprises: determining a plurality of sounds and respective sound types from the environmental sounds; and filtering out sounds having predetermined sound types from the environmental sounds.

Example 19 may include the non-transitory computer-readable medium of example 16 and/or some other example herein, wherein determining the location information comprises performing acoustic trilateration using vehicle-to-vehicle (V2V) communications with other vehicles configured to detect the environmental sounds.

Example 20 may include the non-transitory computer-readable medium of example 16 and/or some other example herein, further comprising computer-readable instructions to: obtain at least one image of an environment external to the cabin; determine a condition based on an analysis of the image; cause to stop playing the portion of the second sound; and cause to play a third sound on the speaker based on the image.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

A software component may be stored as a file or other data storage construct. Software components of a similar type or functionally related may be stored together such as, for example, in a particular directory, folder, or library. Software components may be static (for example, pre-established or fixed) or dynamic (for example, created or modified at the time of execution).

Software components may invoke or be invoked by other software components through any of a wide variety of mechanisms. Invoked or invoking software components may comprise other custom-developed application software, operating system functionality (for example, device drivers, data storage (for example, file management) routines, other common routines and services, etc.), or third-party software components (for example, middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A device, comprising:
    at least one memory device that stores computer-executable instructions; and
    at least one processor configured to access the at least one memory device, wherein the at least one processor is configured to execute the computer-executable instructions to:
        determine at least one first sound from environmental sounds external to a cabin of a vehicle, wherein the cabin is configured to reduce a volume of the environmental sounds below a threshold;
        determine location information comprising a direction and a distance of the first sound with respect to the vehicle;
        generate a second sound based on the first sound and the location information that reproduces a spectral feature of the first sound; and
        cause at least a portion of the second sound to play on a speaker of the cabin,
        wherein causing to play at least the portion of the second sound comprises projecting the second sound such that the second sound has a perceived location that is similar to the first sound.

2. The device of claim 1, wherein generating the second sound comprises reducing noise associated with the first sound by an amount that is based on a user preference.

3. The device of claim 1, wherein determining the first sound comprises:
    determining a plurality of sounds and respective sound types from the environmental sounds; and
    filtering out sounds having predetermined sound types from the environmental sounds.

4. The device of claim 3, wherein determining the sound types comprises assigning respective priorities to the sounds, and wherein filtering out sounds further comprises filtering out sounds that have priorities below respective thresholds.

5. The device of claim 1, wherein determining the location information comprises performing acoustic trilateration using vehicle-to-vehicle (V2V) communications with other vehicles configured to detect the environmental sounds.

6. The device of claim 1, wherein determining the location information comprises determining a Doppler shift associated with the first sound.

7. The device of claim 1, further comprising causing to present an image based on the second sound on a display associated with the cabin.

8. The device of claim 1, wherein the computer-executable instructions further comprise computer-executable instructions to:
    obtain at least one image of an environment external to the cabin;
    determine an emergency condition based on an analysis of the image;
    cause to stop playing the portion of the second sound; and
    cause to play a third sound on the speaker based on the image.

9. A method, comprising:
    detecting environmental sounds external to a cabin of a vehicle and determining at least one first sound from the environmental sounds, wherein the cabin is configured to reduce a volume of the environmental sounds below a threshold;
    determining location information comprising a direction and a distance of the first sound with respect to the vehicle; and
    generating a second sound based on the first sound and the location information that reproduces a spectral feature of the first sound,
    wherein determining the location information comprises performing acoustic trilateration using vehicle-to-vehicle (V2V) communications with other vehicles configured to detect the environmental sounds.

10. The method of claim 9, wherein generating the second sound comprises reducing noise associated with the first sound by an amount that is based on a user preference.

11. The method of claim 9, wherein determining the first sound comprises:
    determining a plurality of sounds and respective sound types from the environmental sounds; and
    filtering out sounds having predetermined sound types from the environmental sounds.

12. The method of claim 9, further comprising causing to present an image based on the second sound on a display associated with the cabin.

13. The method of claim 9, further comprising:
    obtaining at least one image of an environment external to the cabin;
    determining a condition based on an analysis of the image;
    causing to stop playing the second sound; and
    causing to play a third sound on a speaker based on the image.

14. A non-transitory computer-readable medium storing computer-executable instructions which, when executed by a processor, cause the processor to perform operations comprising:
    determining at least one first sound from environmental sounds external to a cabin of a vehicle, wherein the cabin is configured to reduce a volume of the environmental sounds below a threshold;
    determining location information comprising a direction and a distance of the first sound with respect to the vehicle;
    generating a second sound based on the first sound and the location information that reproduces a spectral feature of the first sound;
    obtaining at least one image of an environment external to the cabin;
    determining a condition based on an analysis of the image;
    causing to stop playing at least a portion of the second sound; and
    causing to play a third sound on a speaker based on the image.

15. The non-transitory computer-readable medium of claim 14, wherein generating the second sound comprises reducing noise associated with the first sound by an amount that is based on a user preference.

16. The non-transitory computer-readable medium of claim 14, wherein determining the first sound comprises:
   determining a plurality of sounds and respective sound types from the environmental sounds; and
   filtering out sounds having predetermined sound types from the environmental sounds.

17. The non-transitory computer-readable medium of claim 14, wherein determining the location information comprises performing acoustic trilateration using vehicle-to-vehicle (V2V) communications with other vehicles configured to detect the environmental sounds.

18. A device, comprising:
   at least one memory device that stores computer-executable instructions; and
   at least one processor configured to access the at least one memory device, wherein the at least one processor is configured to execute the computer-executable instructions to:
      determine at least one first sound from environmental sounds external to a cabin of a vehicle, wherein the cabin is configured to reduce a volume of the environmental sounds below a threshold;
      determine location information comprising a direction and a distance of the first sound with respect to the vehicle;
      generate a second sound based on the first sound and the location information that reproduces a spectral feature of the first sound; and
      cause at least a portion of the second sound to play on a speaker of the cabin,
      wherein determining the location information comprises determining a Doppler shift associated with the first sound.

19. A device, comprising:
   at least one memory device that stores computer-executable instructions; and
   at least one processor configured to access the at least one memory device, wherein the at least one processor is configured to execute the computer-executable instructions to:
      determine at least one first sound from environmental sounds external to a cabin of a vehicle, wherein the cabin is configured to reduce a volume of the environmental sounds below a threshold, wherein determining the first sound comprises:
         determining a plurality of sounds and respective sound types from the environmental sounds, wherein determining the sound types comprises assigning respective priorities to the sounds; and
         filtering out sounds having predetermined sound types from the environmental sounds, wherein filtering out sounds comprises filtering out sounds that have priorities below respective thresholds;
      determine location information comprising a direction and a distance of the first sound with respect to the vehicle;
      generate a second sound based on the first sound and the location information that reproduces a spectral feature of the first sound; and
      cause at least a portion of the second sound to play on a speaker of the cabin.

* * * * *